United States Patent [19]

Borg et al.

[11] Patent Number: 5,274,811
[45] Date of Patent: Dec. 28, 1993

[54] METHOD FOR QUICKLY ACQUIRING AND USING VERY LONG TRACES OF MIXED SYSTEM AND USER MEMORY REFERENCES

[75] Inventors: Anita Borg; David W. Wall, both of San Mateo County, Calif.

[73] Assignee: Digital Equipment Corporation, Maynard, Mass.

[21] Appl. No.: 368,273

[22] Filed: Jun. 19, 1989

[51] Int. Cl.⁵ ............................................. G06F 9/44
[52] U.S. Cl. ..................... 395/700; 364/DIG. 1; 364/280; 364/280.4; 364/261.6; 364/262.4; 364/262.5; 364/261.3
[58] Field of Search ............... 364/200, 900; 395/575, 395/375, 250, 700

[56] References Cited

U.S. PATENT DOCUMENTS

| | | | |
|---|---|---|---|
| 3,673,573 | 6/1972 | Smith | 364/200 |
| 4,205,370 | 5/1980 | Hirtle | 364/200 |
| 4,462,077 | 7/1984 | York | 364/200 |
| 4,574,351 | 3/1986 | Dang et al. | 364/200 |
| 4,598,364 | 7/1986 | Gum et al. | 364/200 |
| 4,812,964 | 3/1989 | Kiya et al. | 364/200 |
| 4,819,233 | 4/1989 | Delucia et al. | 364/200 |

Primary Examiner—Kevin A. Kriess
Attorney, Agent, or Firm—Flehr, Hohbach, Test, Albritton & Herbert

[57] ABSTRACT

The present invention utilizes link time code modification to instrument the code which is to be executed, typically comprising plurality of kernel operations and user programs. When the code is instrumented, wherever a data memory reference appears, the linker inserts a very short stylized subroutine call to a routine that logs the reference in a large, trace buffer. The same call is inserted at the beginning of each basic block to record instruction references. When the trace buffer fills up with recorded memory references, the contents of the buffer are processed, either by dumping the contents to an output device emptying the trace buffer, or a cache simulation routine is run to analyze the data. The results of the analysis are stored rather than storing the entire results of the tracing program.

16 Claims, 9 Drawing Sheets

EXPANSION OF INSTRUMENTED CODE:

FIG. 4A

EXPANSION OF INSTRUMENTED CODE:

FIG. 4B

Where ADDR(d[rn]) means the address in memory described by displacement d and the contents of base register rn.

UNIX OBJECT FILE FORMAT:

| header | 80 |
|---|---|
| code segment | 82 |
| data segment | 84 |
| code relocation dictionary | 86 |
| data relocation dictionary | 88 |
| loader symbol table | 90 |

DATA ENTRIES (ONE WORD):

A) 
| LOAD | 10 | ADDR |
| STORE | 01 | ADDR |

INSTRUCTION ENTRY:

B)
| FIRST WORD | 00 | type 1 | size of basic block |
| SECOND WORD | addr. of basic block | | |

CHANGE MODE: TO KERNEL

C)
| FIRST WORD | 00 | to kernel |
| SECOND WORD | 0 | |

CHANGE MODE: TO USER

D)
| FIRST WORD | 00 | to user |
| SECOND WORD | user process ID | |

TRACE BUFFER DATA EXAMPLE

E)
| 00 | Instr type | 5 | } 1st basic block |
| addr1 | | | |
| 10 | addr 4[r2] via r50 | | > load |
| 01 | addr 8[r2] via r50 | | > store |
| 00 | Instr type | (size of block 2) | } 2nd basic block |
| addr2 | | | |

METHOD FOR QUICKLY ACQUIRING AND USING VERY LONG TRACES OF MIXED SYSTEM AND USER MEMORY REFERENCES

FIELD OF THE INVENTION

A method and apparatus for generating an address trace which comprises the sequence of instruction and-/or data addresses referenced by a program during its execution, and more particularly a method for generating very long traces.

BACKGROUND OF THE INVENTION

Traces of memory access patterns provide a window into program execution allowing the simulation of memory systems with the goal of evaluating different cache designs. The analysis of cache designs is becoming even more crucial as caches become dramatically faster than main memory, and cache misses are an ever-more important factor in system performance.

Many of the new processor designs use RISC technology with very fast on-chip caches and somewhat slower off-chip secondary caches. For example, a typical ratio of hit-to-miss costs on today's RISC machines might be 1 to 10, whereas machines currently being designed might have a ratio of 1 to 10 for a hit on the secondary cache or 1 to 200 if the miss must go to main memory. In order to evaluate the appropriate sizes and characteristics of memory systems for the new RISC machines, their behavior must be simulated. While traces are available for a variety of CISC machines, neither traces nor mechanisms for producing them are available for RISC machines.

There is reason to believe that RISC traces are sufficiently different from CISC traces to warrant the generation of fresh traces. RISC code for a program is often twice as large as corresponding CISC code, increasing the number and range of instruction references. Also, effective use of the large register sets built into RISC reduces the number of data references compared to code for a CISC machine. So, at the very least, the balance of instruction and data references will change markedly.

Unfortunately, existing methods for generating traces are inappropriate for use on RISC machines. The most common software method involves the simulation of a program's execution to record all of its instruction and data references. This method is both slow and limited. Simulation is slow for CISC programs, and slower for RISC code, because it contains many more instructions each requiring a pass through the main simulator loop. A 1000× or more slow down makes traces of real time behavior, including kernel and multiprogrammed execution, impossible to accurately simulate. Hardware methods spy on address lines to trace execution in real time, but usually have limited capacity and are not sufficiently selective. Currently, the most accurate method involves microcode modification (Agarwal et al., "ATUM: A New Technique for Capturing Address Traces Using Microcode", *Proceedings of the 13th Annual Symposium on Computer Architecture* (IEEE, New York, June 1986) pp. 119–127). The microcode for a machine is modified to trap address references and generate trace data by watching the address bus and logging those that it sees. A modified machine runs 20 times slower than an untraced machine. The method is not applicable to RISC machines that generate low level instructions to be directly executed, as there is no microcode to be modified.

An additional problem with existing methods is that they all involve the generation and storage of entire traces for later analysis. The requirement that traces be stored limits the length of the trace. The simulation of very large caches, such as those proposed for second level caches in a number of machines, require long traces if the caches are to reach a stable state during the simulation.

Thus, the problems to be addressed in developing the method for acquiring very long traces to be disclosed in detail below include the following. The traces must be complete. They must represent kernel and multiple users as they execute on a real machine. The memory references must be interleaved as they are during execution rather than being artificially interleaved separate traces.

The traces must be accurate. The trace generation must be fast enough not to perturb the accuracy of the traces. That is, the mechanism used must not slow down that execution to the extent that the behavior of the system is no longer realistic.

The tracing must be flexible. The method should include the possibility of picking and choosing the processes to be traced, optional trace kernel execution, and turning tracing on and off at any time.

The traces must be sufficiently long to make possible the realistic simulation of multimegabyte caches.

SUMMARY OF THE INVENTION

In summary, it is an objective of the present invention to provide an approved method of generating long traces in a computer for analyzing memory access patterns and the like.

Another objective of the present invention is to provide a method of storing the results of the tracing operation, and intermittently interrupting the execution of the program(s) being traced to analyze the results of the tracing completed to date in order to avoid the generation and storage of very long traces for later analysis and avoid limitations on the length of traces which may be completed.

A further objective of the present invention is to provide a method of tracing which can interleave the kernel with multiple user programs as they execute on a real operating machine.

Another objective of the present invention is to provide a method of tracing which is fast enough so that the machine operates at a realistic speed.

Another objective of the present invention is to provide a method of forming traces which are long enough to make possible realistic simulation of very large caches.

A further objective of the present invention is to provide a method of linking the kernel and multiple user programs, inserting calls to the appropriate trace routine so that all memory and instruction references in the execution of the link software are accurately recorded in a designated trace buffer.

A further objective of the invention is to provide a method of forming long traces which adjust the recorded memory references for the fact that the code has been lengthened by the insertion of calls to and returns from the trace routine.

In summary, the method of the present invention utilizes link time code modification to instrument the code which is to be executed, typically comprising plurality of kernel operations and user programs. "Instrumentation" refers to the insertion of instructions, subroutine calls and the like into the program to create the trace. When the code is instrumented, whereon a data memory reference appears, the linker inserts a very short stylized subroutine call to a routine that logs the reference in a large, trace buffer. The same call is inserted at the beginning of each basic block to record instruction references. A "basic block" is a sequence of instructions which are all executed if the first is.

When the trace buffer fills up with recorded memory references, the contents of the buffer are processed, either by dumping the contents to an output device emptying the trace buffer, or a cache simulation routine is run to analyze the data. The results of the analysis are stored rather than storing the entire results of the tracing program.

More specifically, the linking loader which links the modules comprising kernel operations or user processes into an executable program has been modified in accordance with the principles of the invention, so that as it links a program, it inserts code at each data memory reference and at each basic block, each basic block comprising at least one executable instruction. The inserted code consists of a stylized subroutine call to a trace routine. When executed, the trace routine records an instruction or data reference in a predefined long trace buffer, the trace buffer having been designated when the kernel was booted. The data recorded represents the instruction or data addresses which would have been accessed had the code not been expanded with the calls. For speed, all significant bookkeeping data used in the trace routine is kept in registers. The only memory reference during its execution is during the write to the trace buffer.

For flexibility, the tracing can be turned on and off at arbitrary times by the user. Only programs which have been specially linked generate traces, and then only when tracing is turned on. Specially linked user programs may run alongside normally linked programs with no interference.

The operating system kernel was modified to allocate the trace buffer, and to cause it to be mapped into the address space of every user process linked by the linking loader. In this way, specially linked user processes can write trace information into the buffer without trapping into the kernel. Since the kernel and the users access the same buffer, the entries made by the kernel and by users are interleaved in precisely the order they are actually executed.

The system kernel is also modified to deal correctly with interrupts occurring during user execution of the trace routine. This assures that upon resumption, after execution by the kernel and possibly other users, the user registers will be updated to reflect the current state of the trace buffer.

The kernel was also modified to proceed correctly when the trace buffer becomes full. The trace routines used by the kernel and user processes differ slightly in testing how full the trace buffer is. If the buffer becomes full while a user is executing the trace routine, a trap is executed. If the buffer becomes full during kernel tracing, or the kernel is entered due to the above trap, tracing is turned off until the buffer is emptied. The kernel as linked for tracing is modified so that the generated traces will reflect only normal kernel operations rather than those executed solely on behalf of the tracing behavior. Once the buffer becomes full, no tracing process is allowed to run until the buffer has been emptied. This assures that user memory references are not missed while tracing is off.

A special process may be used to empty the buffer. This process uses a privileged variation of the read system call to control access to the buffer. It returns from the read only when the buffer has become full, tracing is off and no traced processes are running. Since the buffer is mapped into the user process' address space, including any analysis or buffer emptying program, the data is simply read from memory and appropriate action taken for each entry.

Emptying the buffer may be done by dumping the partial trace to an output device. This, however, makes it difficult to acquire very long traces because of limits in the capacity of an output device. It is therefore more desirable to incorporate incremental simulation of the traces into the special buffer-emptying program. That is, when the buffer is full, an analysis program is run which simulates any particular cache organization or even more than one. The results of this analysis are saved, and the need for saving the trace data is eliminated.

The code that records the address trace according to this invention slows execution of the program by a single order of magnitude which is considered as efficient as known hardware techniques and more efficient than software techniques. Together with the technique of using the traces to drive simulation which occurs periodically as the buffer is full or nearly full, traces may be achieved which are much longer than previously possible. To study very large caches, this greater length is necessary to do a realistic study.

The features and advantages of the present invention will be further understood from the description of a preferred embodiment of the invention given with respect to the following drawings.

DETAILED DESCRIPTION OF THE DRAWINGS

DESCRIPTION OF A PREFERRED EMBODIMENT

Figures 1A, 1B:
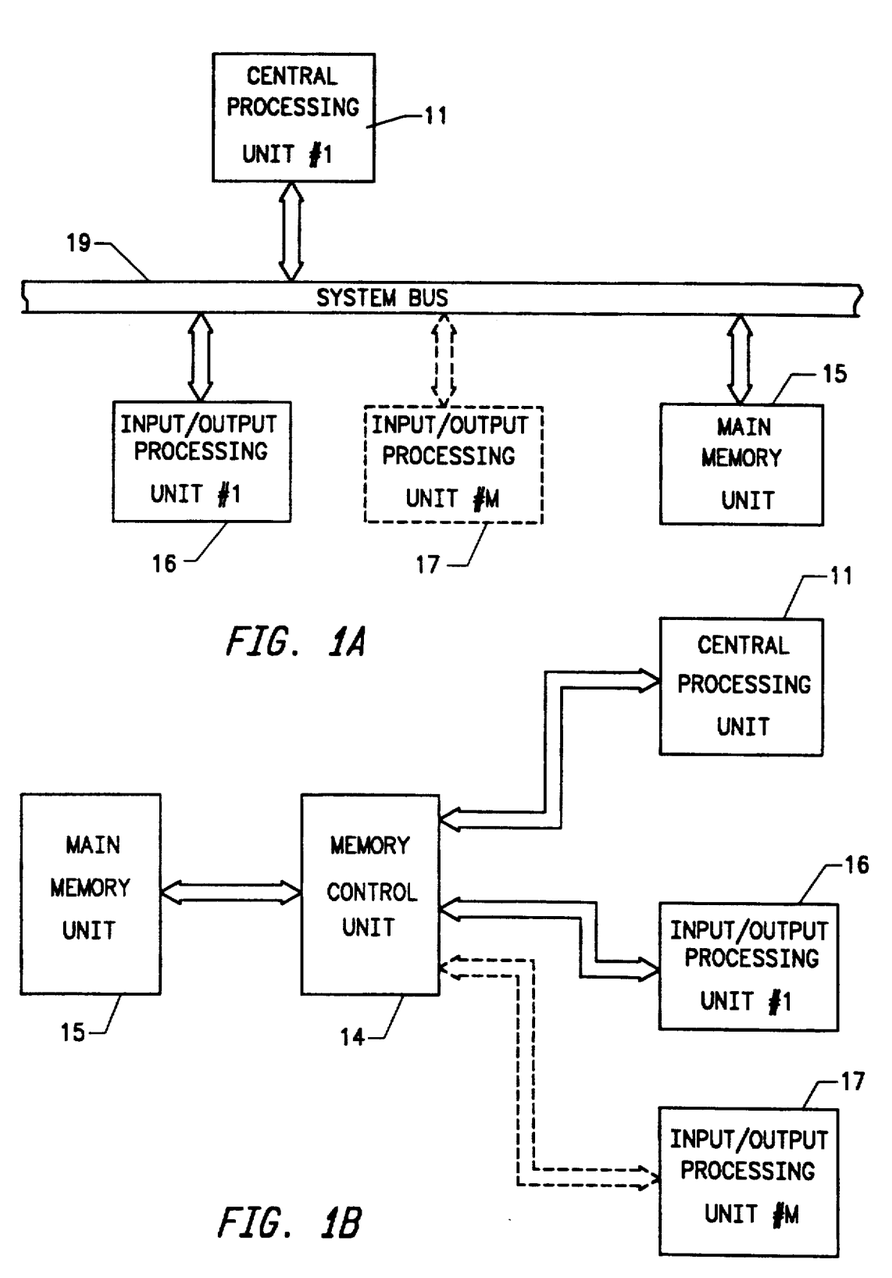
FIGS. 1A and 1B are general block diagrams of systems capable of running the method for quickly acquiring and using long traces disclosed here.

Referring now to FIG. 1A and FIG. 1B, two exemplary data processing system configurations capable of using the present invention are shown. Each component requires control apparatus to provide an interface with the system bus. Referring next to FIG. 1B, a data processing system is shown in which the central processing unit 11 and the input/output unit(s) 16 (through 17) are coupled to the main memory unit 15 through a memory control unit 14, the memory control unit 14 replacing the system bus 19 and the control function performed by individual data processing system components in the bus oriented data processing configuration shown in FIG. 1A. The memory control unit 14 provides a centralized control and monitoring of the transfer of data and instructions that can be more efficient than the bus oriented configuration of FIG. 1, but with the loss of flexibility.

Figure 2:
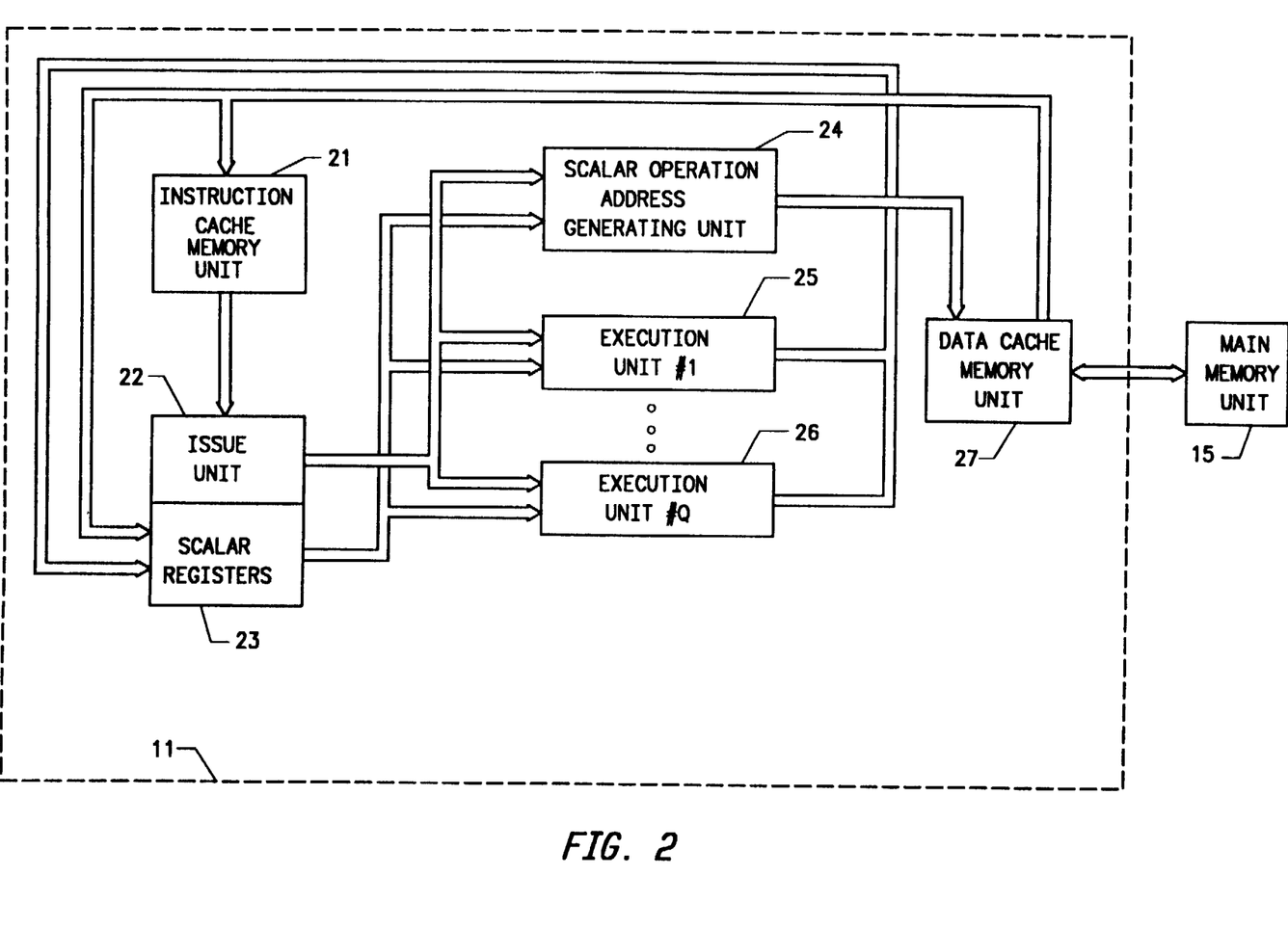
FIG. 2 is the central processing unit of the systems of FIGS. 1A and 1B.

Referring next to FIG. 2, a block diagram of an exemplary central processing unit capable of effective utilization of the present invention is illustrated. The issue unit 22 is responsible for providing (decoded) instructions to the plurality of specialized execution units comprising the scalar operation address generation unit 24 and at least one execution unit (#1) 25 (through execution unit (#Q) 26).

The data processed by the execution units are typically extracted from the scalar registers 23. The resulting data from the execution units are stored in the scalar registers 23 or in the data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus.) The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit. The issue unit 22 has the apparatus to attempt to maximize the processing operations of the execution units. Thus, the issue unit 22 includes prefetch apparatus and algorithms to ensure that the appropriate instruction (including any branch instruction) is available to the issue unit 22 as needed. The plurality of execution units are specialized processing devices for handling certain classes of processing operation. For example, an execution unit can be configured to handle floating point operations or integer arithmetic operations, etc. The issue unit 22 has associated therewith scalar registers 23 that can store data required for the execution of the program or for providing a record of the data processing operation. For example, one register is the Program Counter register that stores the (virtual) address of the next instruction in the executing program instruction sequence to be processed. The scalar operation address generation unit 24 is used to convert virtual addresses to physical locations in the main memory unit 15. The issue unit 22 is also responsible for reordering the data from the execution units in the correct sequence when the execution units process instructions at different rates.

The trace generation method of the present invention will now be explained with reference to the machine described in FIGS. 1 and 2 in the sense that the trace generation method could be applied to programs which run on this machine.

Figure 3:
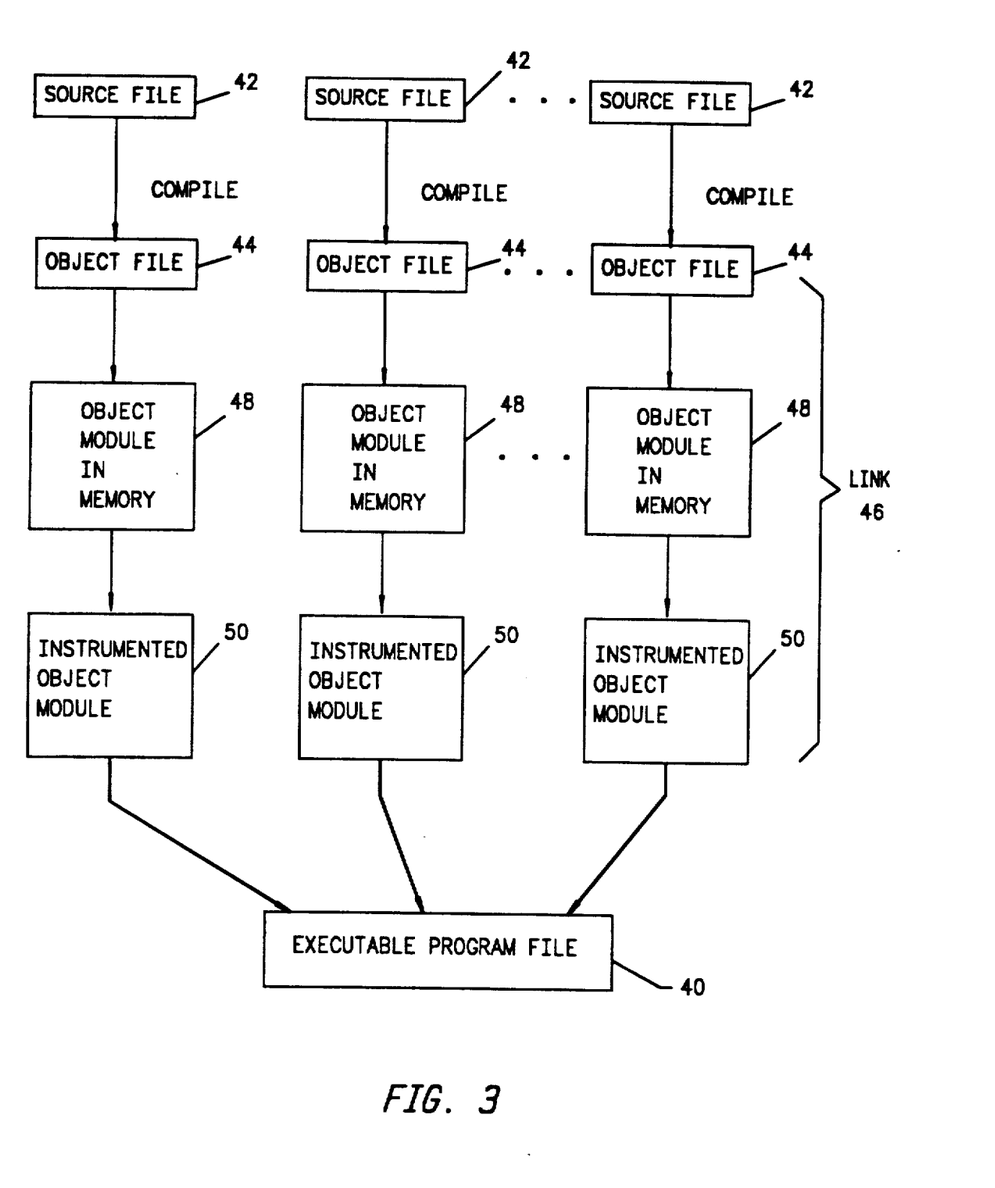
FIG. 3 is a flowchart of the method of combining a plurality of object files of user processes into an executable program file using the link code modification of the present invention.

The trace generation method which will now be described with reference to FIG. 3 et seq. relies on the ability to do link time code modification. That is, in systems such as the type described above (referring to FIG. 3), the executable program file 40 is established beginning with a plurality of source files 42 representing a plurality of user programs which are translated into object files 44 by a compiler and then linked into a single executable program 40. The normal operation of the link program 46 is to read each object file into memory as represented by the blocks 48. The object modules, as compiled, contain sufficient supplementary information to allow the linker to do global register allocation and pipeline scheduling (David W. Wall, "Global Register Allocation at Link-Time", *Proc. of the SIGPLAN '86 Symposium on Compiler Construction*, pp. 264-275, SIGPLAN Notices (July 1986) 21:7; and Wall and Powell, "The Mahler Experience: Using an Intermediate Language as the Machine Description", *Second International Symposium on Architectural Support for Programming Languages and Operating Systems*, pp. 100-104) as well as the code modification required for trace generation. In particular, basic blocks and their sizes are identified at link time. A basic block is a single entrance-single exit sequence of instructions; i.e., a piece of straight line code that will all be executed in sequence.

To implement the present invention, the linker 46 has been modified so that at each memory reference in the code being linked a short stylized subroutine call is inserted to a routine that logs the memory reference in a buffer. It is the insertion of the subroutine calls that forms what shall be referred to therein as instrumented object modules 50. As a part of the subroutine, a return address is saved in a reserved register to negate the need to use any complex mechanism for return from the subroutine call.

In one particular type of computer on which the present method is usable, a Digital Equipment Titan, the instrumented code references memory addresses only during load and store instruction and instruction fetches. As can be seen from reference to FIGS. 4A and 4B, the linker inserts a branch to the trace code subroutine at each load (call LOAD TRACE 68), each store (call STORE TRACE 70), and at the beginning of every basic block (call INSTR TRACE 66). The trace code for loads and stores inserts into a trace buffer a record of each memory reference together with a bit indicating whether the reference was a load or store. The trace code for basic blocks inserts the instruction address as well as the size of the basic block. Since all of the instructions of a basic block are executed if the first one is, a single trace entry reflecting execution of the first instruction is sufficient to later simulate the correct sequence of instruction fetches.

Figure 4A:
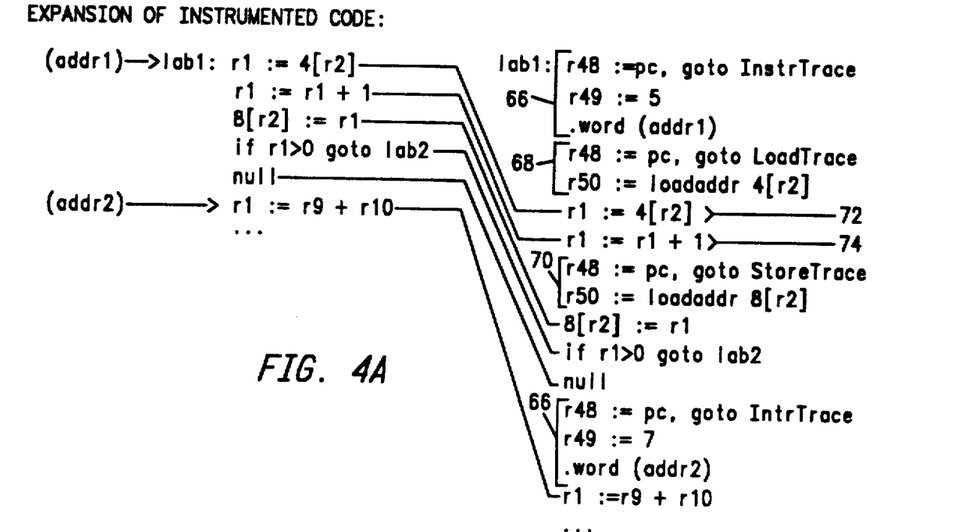
FIGS. 4A and 4B are examples of code instrumented with calls to trace routines by the linker according to the method of the present invention.
Figure 4B:
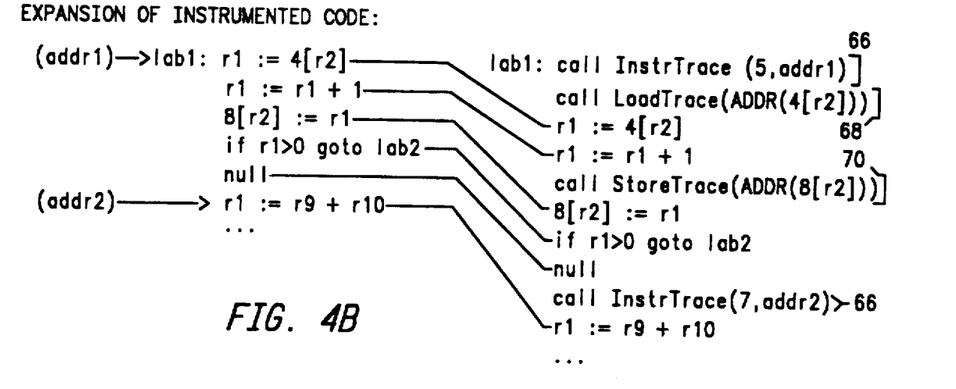
Figure 4C:
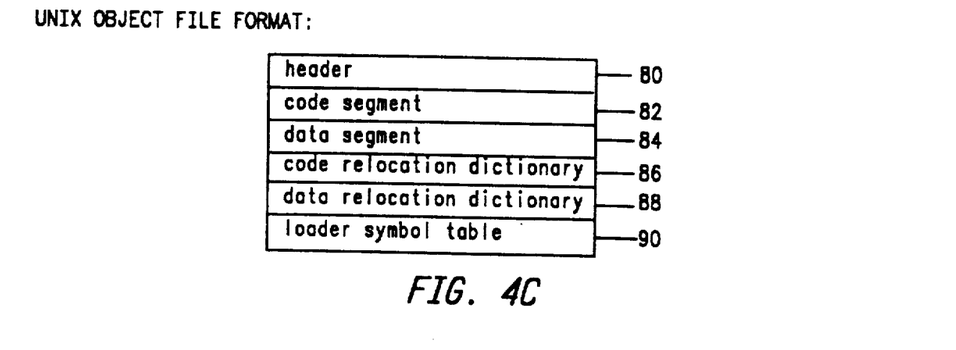
FIG. 4C is a diagram illustrating the format of a typical UNIX object file of a user process of the type which would be utilized in the present invention.
Figure 5:
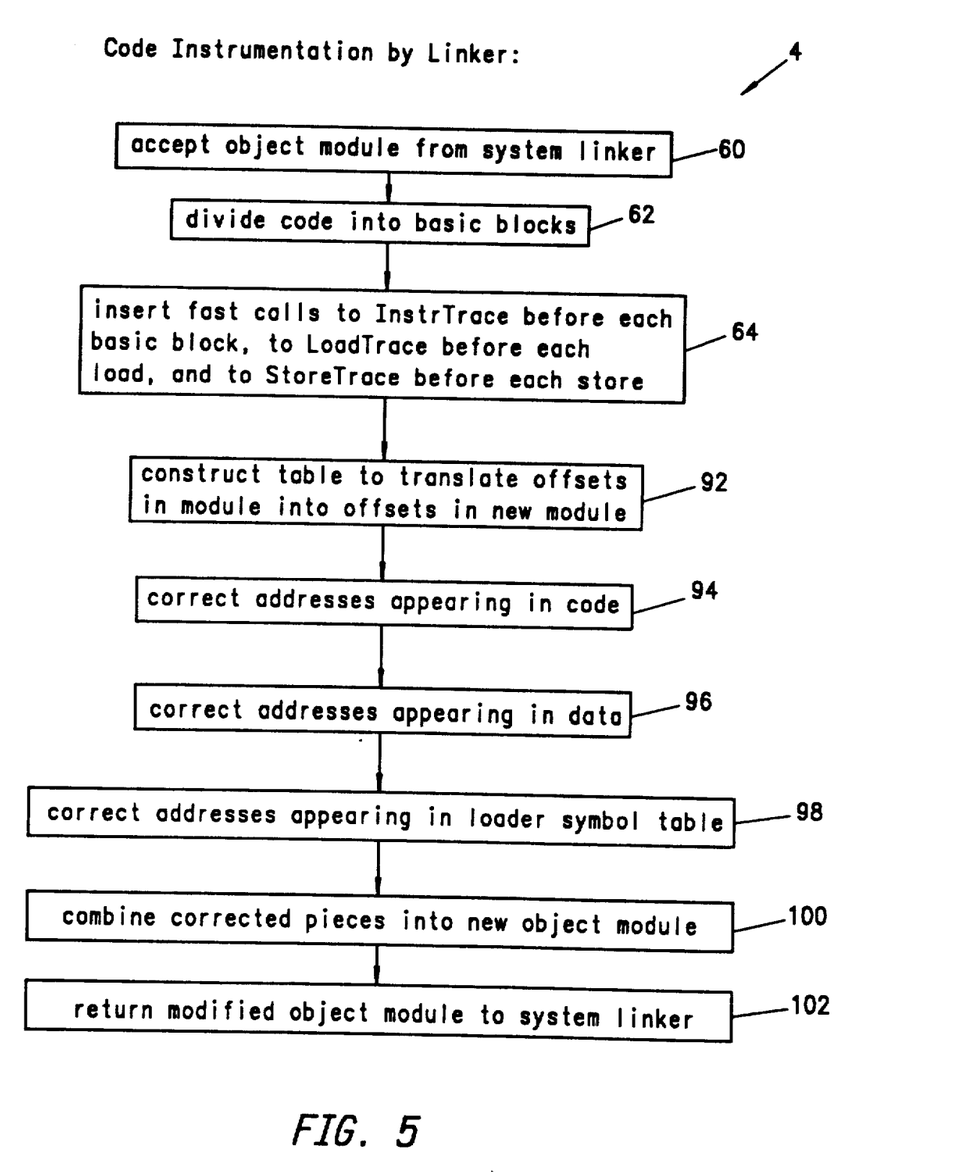
FIG. 5 is a flowchart of the method of code instrumentation by a linker in accordance with the present invention.

The actual sequence of operations by the linker in forming the instrumented object modules 50 which are combined into the executable program file 40 is illustrated with respect to the flowchart of FIG. 5. As a first step, the system linker accepts 60 an object module 48, and divides the code 62 into basic blocks. Each basic block, without instrumentation, appears as illustrated to the left of FIGS. 4A and 4B.

The next step by the linker is to insert fast calls 64 to INSTR TRACE 66 before each basic block to LOAD TRACE 68 before each load, and to STORE TRACE 70 before each store. In reviewing this code, it should be remembered that once a basic block is entered, the entire block is executed. Therefore, the instruction trace call only needs to appear at the time that the first instruction 72 of a basic block is to be executed. Thereafter, the succeeding instructions of the block 74 are necessarily executed and are not preceded by the INSTR TRACE call. Each memory reference is, of course, preceded by either the call for the LOAD TRACE 68 or the call for the STORE TRACE 70.

As an example of the code inserted in these routines, the instruction trace routine 66 will store in the trace buffer both an indication of the length of the piece of straight line code, which in this case is five lines, and the address of the first instruction of the basic block. In the course of executing this basic block, the first line is a load instruction. Therefore, a second call to the load trace routine 68 must be inserted. Further in this basic block, data is stored; this is reflected by a call for the STORE TRACE 70. The use of three different call routines is for the sake of efficiency. One general routine could have been provided, but such a routine would have required a test at the beginning to establish whether the memory reference was for an instruction, load or store which would have required executing additional instructions and slowed down the execution of the code.

It is also important to note that as the cods is linked, the linker computes the actual virtual address (or physical address for the kernel) from the base and offset data made available, and incorporates that information in the call so that the actual address of each reference is written in a trace buffer. That is, an address is computed and written into the trace buffer which is the address at which the data or instruction would have been located had the executable code not been expanded with trace branches. A trace resulting from the execution of such specially linked code incorporating this address recalculation step accurately represents an execution of normally linked code for later analysis.

This address recomputation can be understood by first referring to a standard UNIX object file format wherein the file includes a header 80, code segment 82, data segment 84, code relocation directory 86, data relocation directory 88, and loader symbol table 90. As can be seen most clearly from the instruction calls inserted in the code shown at the righthand side of FIG. 4B, a part of the operation of the linker is to calculate the address in memory at which the data or instruction would have been located had the code not been expanded, and to insert that calculated address into the instruction call for storage in the trace buffer. This is achieved by constructing a table 92, FIG. 5, to translate each offset in the module into an offset in the new instrumented module, so that the instrumented module will behave like the uninstrumented module when linked. The linker uses the relocation dictionaries 86 and 88 to find the places in the code and data where addresses would appear literally, and translates these addresses by looking them up in this table. The linker does this first 94 for the code, and then 96 for the data, and finally 98 for the loader symbol table. The corrected code and data and loader symbol table, together with the associated code and data relocation dictionaries, are then combined 100 into a new object module that includes the instrumented code as shown in FIGS. 4A and 4B. This modified module is returned 102 to the system linker for linking into the executable program file.

Figure 6A:
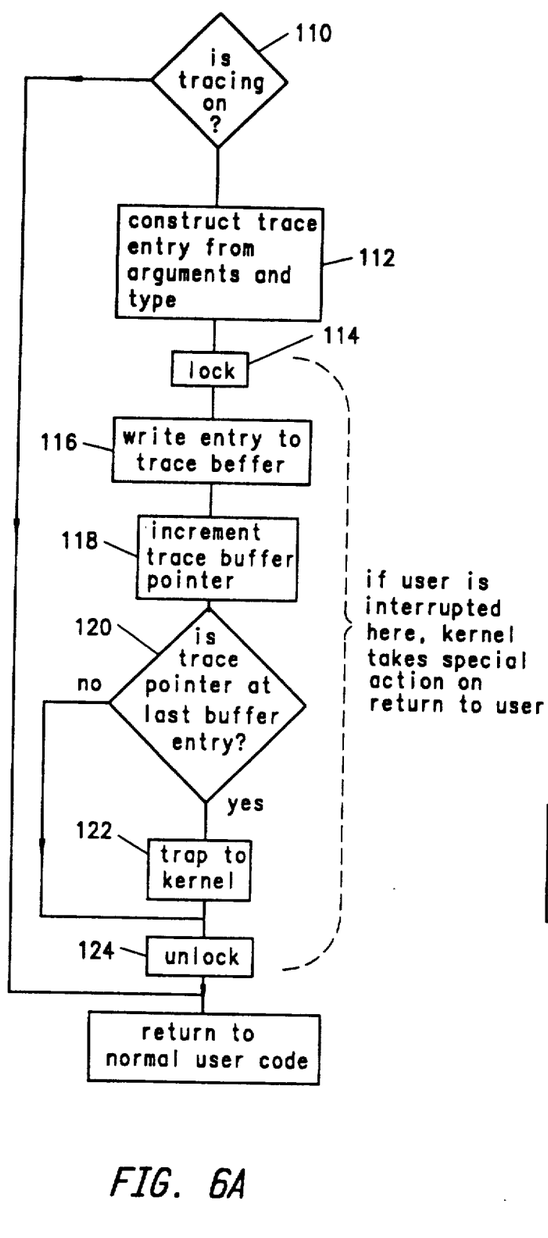
FIGS. 6A and 6B are flowcharts of the operation of the trace code in a user process or a kernel of the operating system.
Figure 6B:
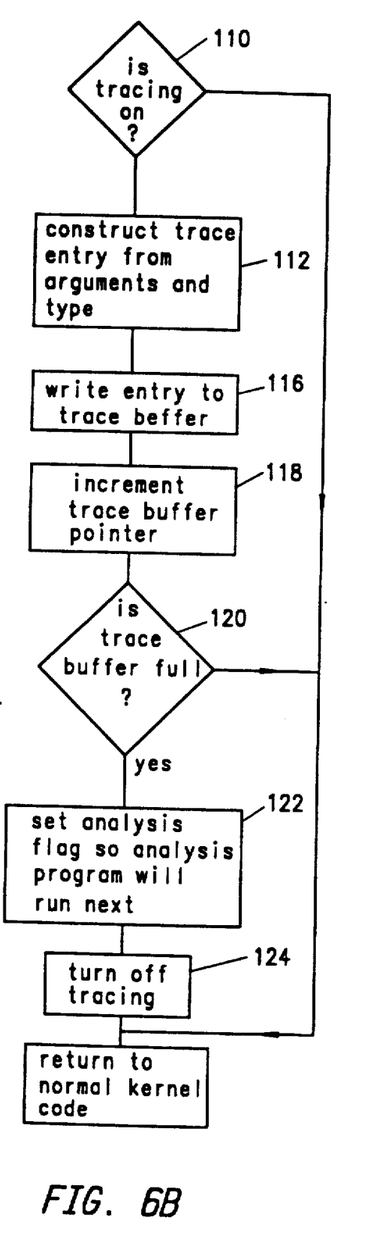

Referring next to FIGS. 6A and 6B, these figures are flowcharts which show the execution of the instrumented code. FIG. 6A shows the execution of an instrumented user program; FIG. 6B illustrates execution of the kernel or operating system which is also instrumented. One of the advantages of this invention is that code can be traced which comprises a sequence of user programs interleaved with functions performed by the kernel, with all of the code being fully instrumented so that the long traces accurately represent actual program operation.

Referring first to FIG. 6A, the first step is to check 110 whether tracing is on. If not, operation returns to the instrumented program which executes without anything being stored in the trace buffer.

If tracing is on, a trace entry is constructed 112 by taking the arguments that were previously inserted in the instrumented code, the address and so on, and combining that with a flag which says which of the three kinds of trace information is being stored. Next, a lock 114 is performed which sets flags which will allow the kernel to react properly if by chance operation is interrupted while the entry is being made in the trace buffer. This lock will cause the trace information to be properly stored in the trace buffer and the pointers to be properly set when the execution returns to the user program. The trace information is then written 116 into the trace buffer, and the trace buffer pointer is incremented 118. The trace pointer 120 is then checked to determine if it is at the last buffer entry. If it is, the program traps to the kernel, which will cause an analysis program to run which analyzes the data now stored in the trace buffer, typically executing one or more cache simulation programs and storing the results of the analysis. The buffer data may then be discarded. Alternatively, the buffer data may be transferred to some output port. If the trace pointer is not at the last buffer entry, an unlock 124 is executed, and the user program continues.

Referring to FIG. 6B, it can be seen that the sequence of operation again includes checking 110 to see whether tracing in on, constructing 112 the trace entry, writing 116 the entry to the trace buffer, and incrementing 118 the trace buffer. Obviously, however, if the kernel is being traced and executed, a trap to the kernel when the trace buffer is full 120 would be inappropriate.

Therefore, if the trace buffer is full, an analysis flag is set 122 so that the next program to be executed will be the analysis program referred to above. While the analysis program is running, tracing is turned off 124. On completion of the analysis program, execution returns to the kernel code.

Because the user programs and kernel operations have been fully instrumented with trace code calls and address recalculation information, the operating system's primary trace-related job becomes the management of the trace buffer. The trace must reflect the actual sequence of memory references by a mixture of user and kernel programs. Since this sequence cannot be achieved by reconstruction of the combined trace from individual traces, a single trace buffer is shared among the kernel and all running processes. Only those user processes that have been instrumented for tracing actually use the buffer.

At boot time, the trace buffer is allocated from the free page pool. The trace buffer 130 which appears on FIG. 7 has a size which is typically a compiler time constant but could easily be defined at boot time. In a system running on a computer with 128 megabytes of memory, experiments have used 32 or 64 megabyte trace buffers, with the larger trace buffer allowing for longer execution times. Of course, when the buffer is full, the collected data must either be written out to an external medium or analyzed on the fly. In either case, tracing must be disabled during extraction of the data from the trace buffer. For this period of time, traced user processes would not be allowed to run, and kernel tracing would be turned off. This may require I/O interrupts be allowed to pile up to be handled in a bunch, or will be handled untraced. In either event, 64 megabytes is considerably longer than most existing traces.

Returning to the definition of the trace buffer, in the preferred embodiment, the trace pages of the trace buffer are permanently associated with the trace buffer and are not pageable. During execution, the machine simply behaves as if it had less physical memory.

From within the operating system, the trace buffer 130 is referenced directly using its physical addresses. To make user references to the trace buffer sufficiently fast, the buffer is mapped into the high end of every user's virtual address space. This is apparent from FIG. 7 which shows a typical UNIX implementation of a process' virtual memory as a variable sized set of segments 132, 134 associated with each user program. As illustrated, the segment associated with user program 1 includes a variable sized set of segments 132, each segment of the set of segments being associated with a page table 136 which in turn provides access to real pages in memory 138. The segments map virtual addresses to physical addresses in memory 138. Thus, for example, an address in the first page of user program 1's segment 0 is mapped through the page table 136 to a real address in page A.

Figure 7:
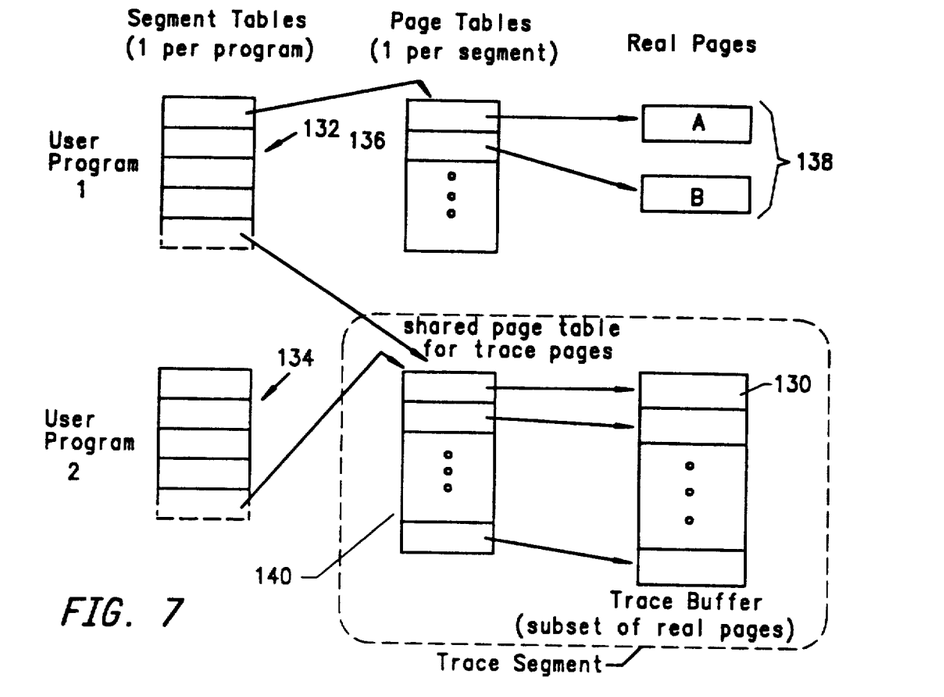
FIG. 7 illustrates a method of mapping the trace buffer in which trace memory references are stored into the virtual memory address space of each user program whose memory references are traced in accordance with the present invention.

Each process or user program includes segments for text, initialized data, uninitialized data, and stack. The trace buffer 130 is made up of a shared subset of real pages which are mapped through a shared portion 139 of a page table 140 into every user program so that every user program accesses the same trace buffer.

As shown in FIG. 7, in each of the segment tables 132, 134, the stack which usually resides at the high end of the virtual address space is moved down below the trace buffer. All of the trace segments in each user program access the same shared page table 140. That is, every user program points to the same page table, so that the same virtual address in two different user programs will map into the same real page in the trace buffer 130. This mapping allows the user trace code in every user process to write directly to the trace buffer 130 referencing it by its virtual addresses. The operating system, of course, can access the trace buffer directly through its physical addresses. By providing the shared page table for all trace pages, the trace buffer is mapped into the same virtual address space in every user process. Movement from one user process to another will still result in storage of all trace code in consecutive addresses in the trace buffer.

Figure 8:
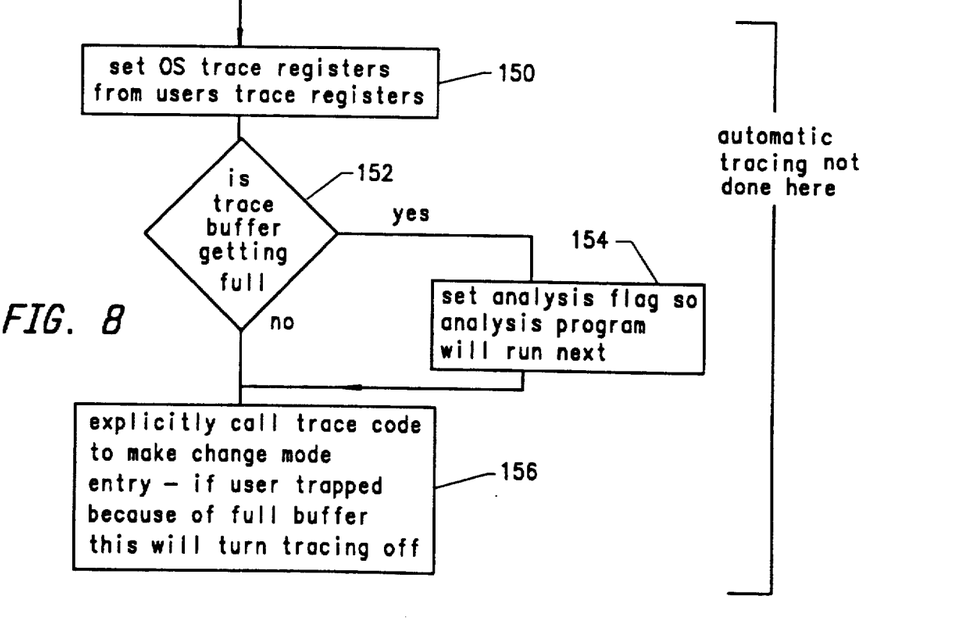
FIGS. 8, 9 and 10 are flowcharts of modifications to the operating system to illustrate handling of entry to the operating system via interrupt or trap, choice of the next user program to be run, and returns from the kernel (operating system) to a running user program.

Certain modifications and additions need to be made to the operating system in addition to the instrumentation of the linked code. These additions and modifications will be explained with reference to FIGS. 8, 9 and 10. FIG. 8 illustrates the modification to be made to account for entry to the operating system from a user process via an interrupt or trap. On entry to the operating system, the operating system trace registers are set 150 from the user trace registers so that the next entries to be made in the trace buffer will be consecutive. The trace buffer is tested 152 to see if it is getting full. The test is made to determine whether there is still some space left in the trace buffer 130, rather than whether it is actually full, as occurs in running a user process, in order to leave a limited amount of room for recording of the operating system trace prior to actually starting an analysis program. If the trace buffer is getting full, then an analysis flag is set 154 so that an analysis program will be run next to analyze the trace data now stored in the trace buffer, after which the trace buffer may be emptied. After the analysis flag has been set, or if the trace buffer is not full, then an explicit call is executed 156 to make a change mode entry in the trace buffer. This change mode entry is necessary upon every entry from a user process to the operating system, or return from the operating system to the user process, because the addresses inserted in the trace buffer by the kernel are physical addresses, whereas those inserted by user processes are virtual addresses. It is essential for the analysis code to be able to tell the difference. It is also useful to be able to associate sequences of virtual addresses with a particular process when more than one is being traced. Thus, on every transfer into or out of the kernel, a change mode entry is made 156 in the trace buffer 130. This entry indicates whether the change is from user to kernel or kernel to user, and which user process is being transferred to or from.

Figure 9:
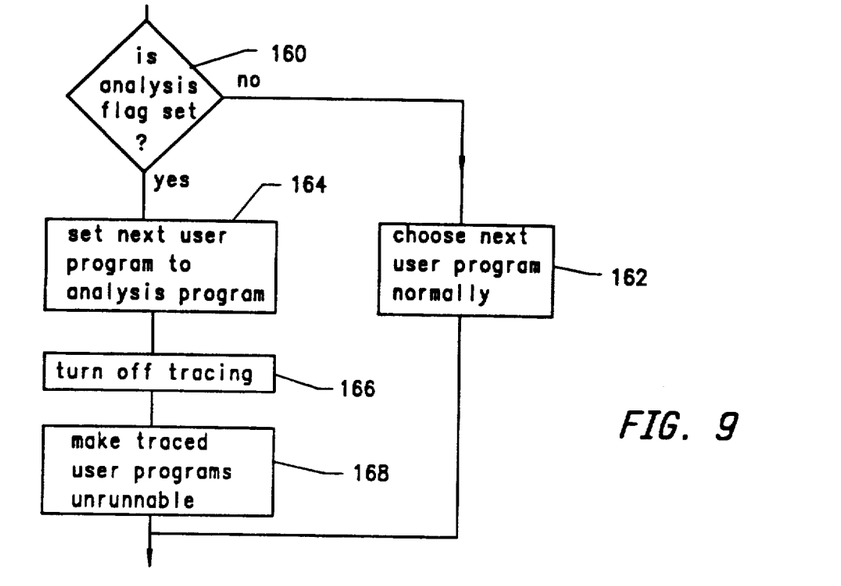

FIG. 9 illustrates a modification to the operating system which determines the choice of the next user program to be run in response to the set analysis flag 154 step explained with reference to FIG. 8. The analysis flag is periodically tested 160, and if it is not set, then the next user program is chosen normally 162. If the analysis flag is set, then the next user program to be run is the analysis program 164, which requires turning off tracing 166, and making all traced user programs unrunable 168 for the reasons discussed above in the section which discussed the amount of memory to be allocated to the trace buffer. The analysis program which may be any one of a type already well known in this technology is awakened from its WAIT state on a special read system call by the execution of step 164.

Figure 10:
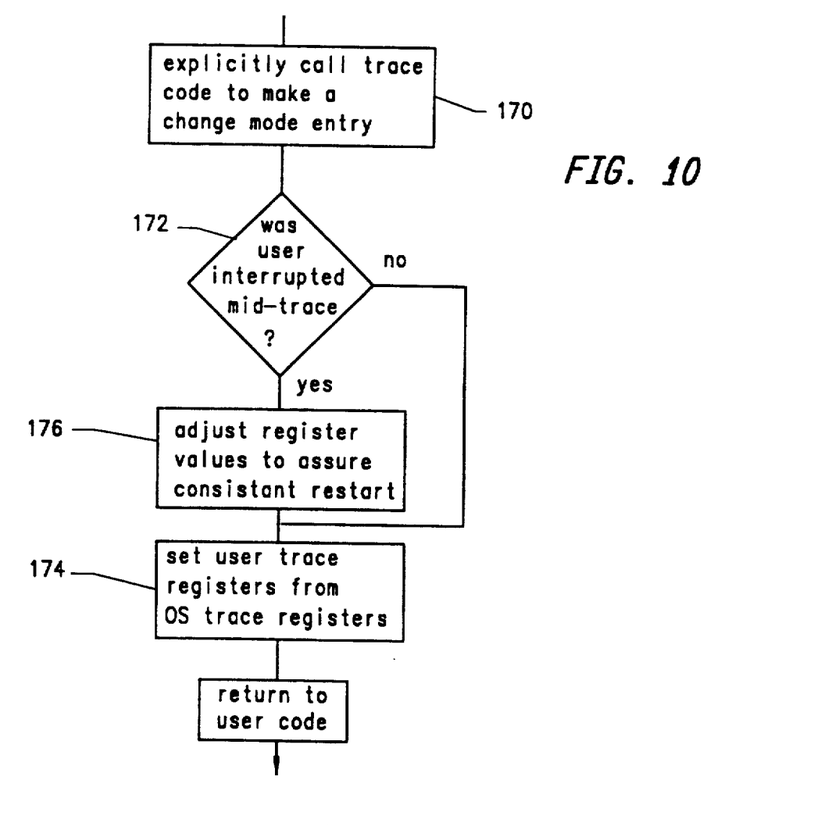

The operating system modification shown in the flow-chart of FIG. 10 is especially necessary on return from the kernel (operating system) to a user program to make sure that the entries in locations in the trace buffer are consecutive and consistent. The kernel uses a separate register set from user processes. To assure that the trace registers are always correct, some of their values must be copied back and forth between register sets when moving between the user and kernel modes. On every transfer from one register set to another, two values (the current buffer index and buffer pointer) must be copied from one register set to the other via memory. If the transfer is between a kernel register set and a user register set, the buffer pointer is not copied, but is recalculated from the index and virtual or physical buffer base address is appropriate. The translation to a virtual address is the same for all processes since the buffer resides at exactly the same virtual address in all processes as discussed above.

With respect to the code charted in FIG. 10, it is also important to note that on the preferred embodiment of the machine for which this process was written, kernel execution is uninterruptible; however, user execution can be interrupted at any time. This is a particular concern if the interrupt is in the middle of trace code. This complicates the trace code linked with user programs, and the initial code executed on entry to and exit from the kernel. The two must be combined to assure that such interrupts during shared uses of the traced buffer are handled correctly. Since interruption can happen between arbitrary instructions, a lock value (requiring a register) is used as was explained with reference to steps 114, 124 of FIG. 6A to indicate to the kernel that the user was interrupted mid-trace and that special action must be taken.

Thus, the return from the kernel to the user program begins with an explicit call to trace cods 170 to make a change mode entry in the trace buffer so that the buffer reflects the fact that virtual addresses are now being stored. The system then checks the lock register 172 to determine whether the user process was interrupted in midtrace, i.e., between lock 114 and unlock 124 in user trace code. If not, then the user trace registers are set 174, from the operating system trace registers, and the return is made to the user code. If the interrupt did occur in mid-trace, then the kernel recognizes that the interruption was in mid-trace and checks the lock value register, adjusts the kernel's trace registers, and then restores the user trace registers 176 to continue operation of the user process in mid-trace on the return from the kernel mode rather than a direct return to the instruction being executed in the user process itself. The only inelegant result of this approach is that an arbitrary amount of trace data generated by the kernel or other user process may intervene in between two words of a user process trace entry.

FIGS. 11A-11E illustrate the format of the trace buffer entries produced by a preferred embodiment of the program. Data entries are each one word long (FIG. 11A), preceded by a two-bit code indicating a load or store memory reference.

All other entries (FIGS. 11B-11D) are two words long, with zeros in the first two bits of the first word, followed by additional information, as illustrated.

Figure 11:
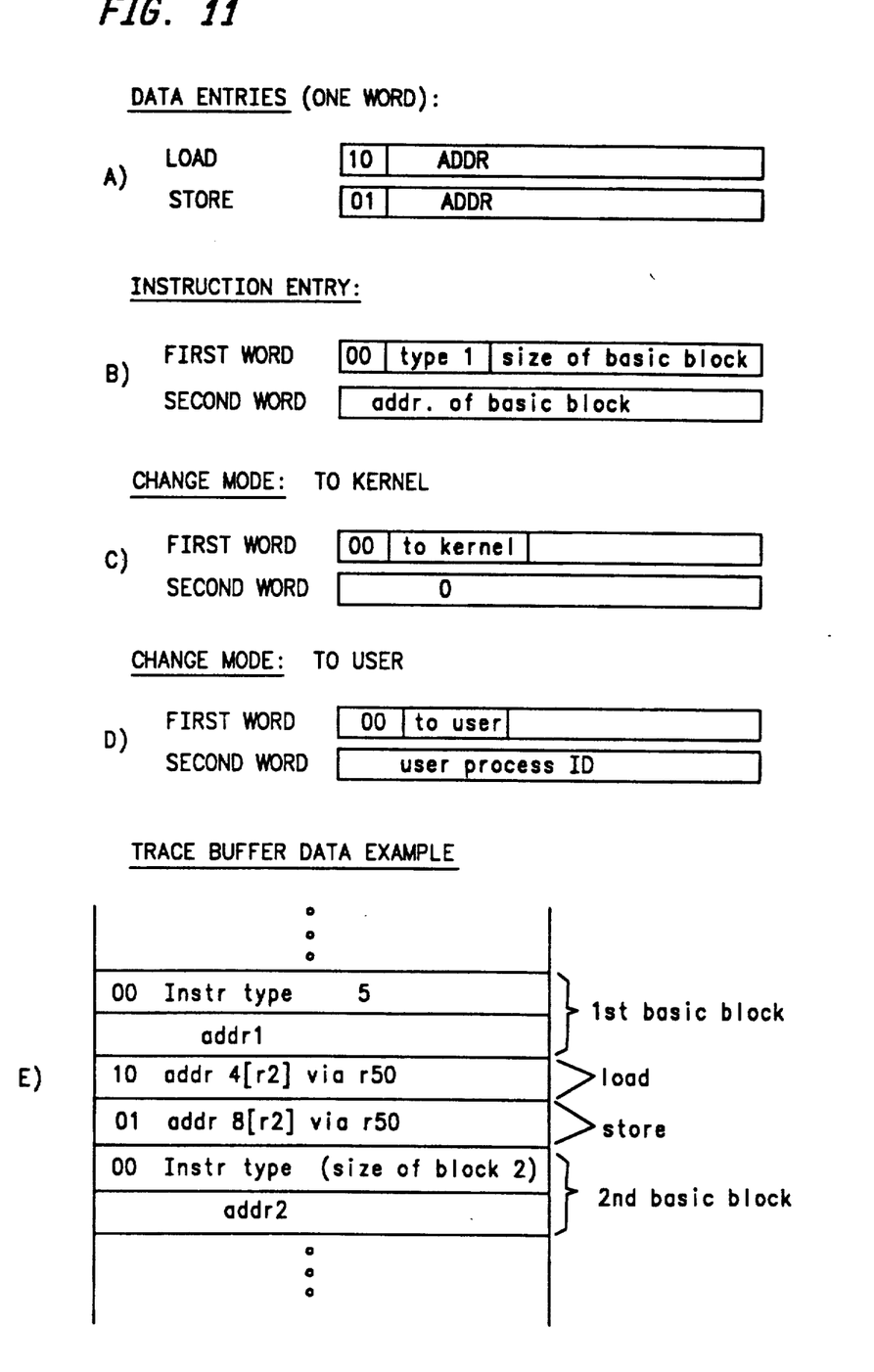
FIGS. 11A through 11E illustrate the format of the trace buffer entries produced by a preferred embodiment of the program.

FIG. 11E represents the entries which would appear in the trace buffer upon execution of the expended code shown in FIGS. 4A and 4B.

Tracing is controlled in two ways. Only code that has been specially linked as described with reference to FIGS. 3-5 generates traces, and then only when tracing is turned on. It is possible to trace any subset of the running kernel/user programs.

Tracing is done only when a trace flag kept in one of the trace registers is on. The initial value in the trace register is 0 (off). The first operation in the trace code (step 110, FIGS. 6A, 6B) is to test the value of the trace flag. If it is off, an immediate return is executed. Tracing is turned on at the first interrupt following a right to a known kernel location. Tracing is turned off in an analogous fashion (step 124, FIG. 6B).

When tracing is off, additional instructions are executed at every trace point. No additional cost is incurred during the execution of user code but is not linked for tracing whether or not tracing is turned on. The kernel, even when not being traced, may be somewhat slower because of the general overhead associated with incorporating tracing into the operating system.

The system as thus described can very quickly gather an address trace whose length is the size of the trace buffer. Unfortunately, even with a 64 megabyte trace buffer, the trace represents only about two seconds of execution time on a Digital Equipment Titan Computer or equivalent, or 30 to 35 million memory references. While such traces are much longer than those commonly available and are interesting for some purposes, they may not be long enough to analyze the behavior of the very large caches whose analysis is highly desirable. The ultimate goal is to be able to understand the long run behavior of an executing machine. This means that the trace data must be extracted from the buffer in such a way that execution can continue without too much disruption, and in particular without effecting the accuracy of the trace data. Neither extracting nor analyzing the data can be done simultaneously with tracing, because either is orders of magnitude slower than trace generation. Thus, all methods of dealing with long traces require that tracing be periodically interrupted for a period of time. The challenge is to assure that the resulting traces are seamless. That is they must reflect address reference patterns that would have occurred had the machine continued tracing without interruption.

The interruption may entail extracting the partial trace and writing it, possibly in a compressed form, to some storage medium for later analysis. Alternatively, the partial trace may be analyzed immediately, eliminating the need to save the trace. The first possibility does little to solve the ultimate problem of very long traces where storage is difficult or impossible. The preferable alternative is to analyze the trace data as it is generated on the same machine that is being traced. It is for this reason that the operating system has been modified as shown in FIGS. 8 and 9 so that when the trace buffer becomes nearly full, the operating system turns off tracing and runs a very high priority analysis process. As with any other user process running on the trace machine, the trace buffer is mapped directly into the analysis program's address space using the approach shown and explained with reference to FIG. 7, so that the data can be directly accessed.

Execution of an analysis program is controlled by the use of a variant of a read system call. The read returns the virtual address of the beginning of the trace buffer and the number of available entries only when the buffer is full or nearly full. (See FIG. 9, steps 164-168.) The program may then do anything it chooses with the trace data. The operating system guarantees that during the execution of an analysis program tracing is turned off and trace programs are not scheduled for execution.

When all current data in the buffer has been processed, the special read is again executed, tracing is turned back on, and traced programs can once again execute.

In summary, the link time code modification of the user processes provides a simple approach to providing the necessary transformations on the modules being linked to incorporate the appropriate calls to the trace routines. Incorporating the address modifications so that the memory instruction and data references accurately reflect the true memory references as they would occur on unmodified code ensures the accuracy and reliability of the trace results. Mapping out the trace buffer into the user space of every user process being traced, as well as the analysis program, provides for a consistent and reliable storage of the sequence of memory references throughout an entire user process, even as the process may be interleaved with kernel operations. The insertion in the trace buffer of a reference to indicate each switch from a user process to the kernel, and each return from the kernel to the user process, ensures that the memory addresses will be actually translated to reflect the fact that user processes store virtual memory addresses, while kernel processes will result in the storage of physical addresses of memory references. The periodic interruption of the process when the trace buffer is full or almost full for on-the-fly analysis of the long trace generated minimizes the need for storage associated with the development of the long trace.

Other features and advantages of this invention will be apparent to persons of skill in this technology familiar with the many problems in creating long traces for operating machines. Alternatives and modifications to the preferred embodiments specifically described above may also become apparent to a person of skill in the art who studies the above disclosure. Therefore, the scope of the present invention is to be limited only by the following claims.

What is claimed is:

1. A method of generating long address traces of memory access patterns in a computer, comprising the computer implemented steps of linking a plurality of object modules by a linker means to form a linked, executable program.

said linking step including link time code modification, concurrently with said linking step inserting trace branches at memory references in said executable program including a call to a trace recording subroutine to record said memory reference in a trace buffer, said trace recording subroutine including an instruction to return to said linked executable program, said link time code modification further including identifying basic blocks in said linked program, and inserting a call to said trace recording subroutine to record said basic block in said trace buffer, executing said linked program to cause recording in said trace buffer of each said memory reference during execution of said linked program to generate said long address trace.

2. A method as claimed in claim 1 wherein execution of each of said trace branches includes the step of computing the actual virtual address of the memory reference, taking into account an offset in length created in said linked, executable program by insertion of said trace branch.

3. A method as claimed in claim 1 including the step of periodically testing said trace buffer during said executing step to determine whether said buffer is full or nearly full, and responsive to said testing step determining that said buffer is full or nearly full, emptying said buffer to a selected output port for analysis of said long trace, and resetting a buffer pointer to a beginning of said buffer.

4. A method as claimed in claim 1 wherein each object module comprises kernel operations of an operating system of said computer and at least one user program, forming said linked program of a plurality of said user programs and said kernel of said operating system, any one or more of said user programs and said kernel being modified by said linker program to insert trace branches providing access to said trace buffer.

5. A method as claimed in claim 4 wherein each of said user programs includes a defined virtual address space, said trace buffer being mapped into the virtual address space of each of said user program.

6. A method as claimed in claim 4 wherein said kernel is modified by said linker program to have inserted trace branches directly access the physical address of said trace buffer.

7. A method as claimed in claim 5 wherein said trace buffer is mapped into the high end of said virtual address space of each said user program, translation to a virtual address being the same for all processes, since the buffer resides at exactly the same virtual address in all user processes.

8. A method as claimed in claim 6 wherein said trace buffer comprises a single, common address space access to which is shared by all of said user programs and said kernel.

9. A method as claimed in claim 8 wherein the only memory reference in said trace recording subroutine is the write to the trace buffer.

10. A method as claimed in claim 8 including the step of synchronizing the address pointer for said kernel and the address pointer for each of said user processes, the pointer being reset each time that the trace buffer is emptied.

11. A method as claimed in claim 1 including a step of assigning a trace register in said trace buffer as a trace flag storage region, a first step in said trace recording subroutine comprising testing said flag to determine if tracing is being done, an immediate return being executed if the trace flag is off, tracing being completed if the flag is on.

12. A method as claimed in claim 4 including the step of inserting a change mode entry into said trace buffer on each transfer into or out of the kernel.

13. A method as claimed in claim 1 including a step of periodically emptying the buffer including the step of periodically testing said trace buffer to determine whether said buffer is full or nearly full, turning off tracing on determining that the buffer is nearly full, running an analysis program on the contents of said trace buffer, saving the results of said analysis program, and discarding the contents of said trace buffer so that trace generation may continue.

14. A method as claimed in claim 13 wherein said analysis program includes a defined virtual address space, and including the step of mapping said trace buffer into the analysis program address space so that the trace data can be directly accessed.

15. A method as claimed in claim 3 wherein said kernel is modified by said linker program to have inserted trace branches directly access the physical address of said trace buffer.

16. A method as claimed in claim 15 wherein said trace buffer is mapped into the high end of said virtual address space of each said user program, translation to a virtual address being the same for all processes, since the buffer resides at exactly the same virtual address in all user processes.

* * * * *